Aug. 15, 1939.   R. C. CROSS   2,169,631
ROTARY VALVE ENGINE
Filed Dec. 12, 1936   2 Sheets-Sheet 1

INVENTOR
ROLAND C. CROSS

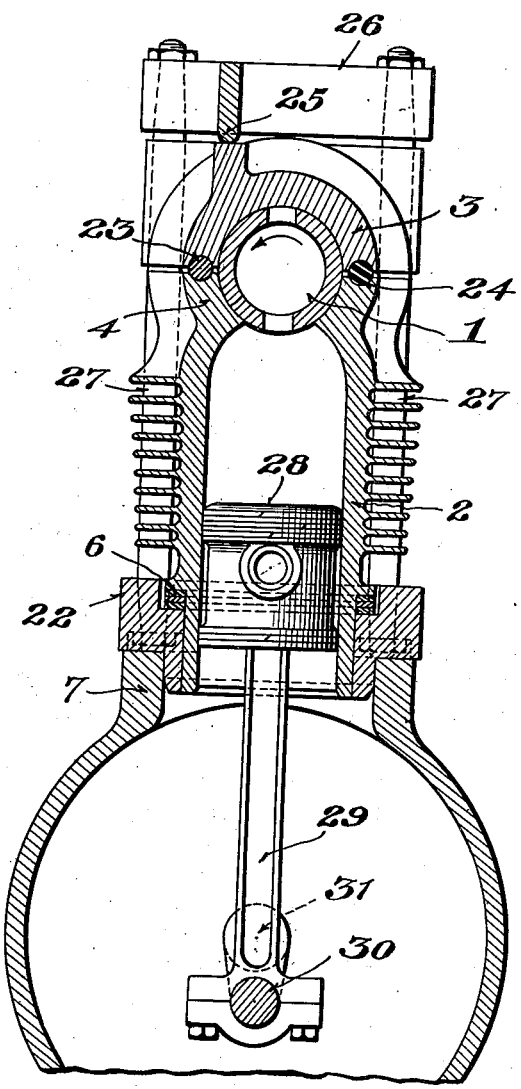

Patented Aug. 15, 1939

2,169,631

UNITED STATES PATENT OFFICE 2,169,631

ROTARY VALVE ENGINE

Roland Claude Cross, Bath, England

Application December 12, 1936, Serial No. 115,618
In Great Britain February 21, 1936

11 Claims. (Cl. 121—187)

This invention relates to rotary valve internal combustion or other engines or pumps, of the kind including a two-part valve housing, and in which the housing parts are so mounted that their pressure on the valve is increased as and when pressures are generated in the cylinder. For instance, it is known to make the cylinder (and with it the lower housing part) floating between the upper housing part and the crank case, and to construct the cylinder in such a manner that pressures therein will press it with their full force on to the valve. In this known type of engine pressures in the cylinder are utilised for loading the housing parts in their application to the valve member with a view to providing a fluid tight seal therebetween. This pressure on the valve member has been found in certain circumstances to be excessive, particularly at high engine speeds.

According to the present invention means are provided for controlling the amount of pressure which is applied to the valve in the foregoing manner, and said means consists of a mechanical arrangement, for example a lever system, operated by the force of cylinder pressures, and pressing the valve housing with less force than the cylinder pressures. Thus, whilst maintaining a load on the valve proportional to cylinder pressures, the degree of loading actually applied is reduced and controlled according to requirements.

In this specification the term "floating" denotes that the member so described is yieldable in relation to other parts so as to be capable of transmitting varying pressures applied thereto to another member contacting therewith, whether the said floating member be actually displaced or not. The term "stationary" where applied to a part denotes that that part is non-floating in the above sense. Further, for simplicity, it will be assumed that the engine cylinder is vertically disposed and the rotary valve surmounts it, the valve housing being split in a substantially horizontal plane to form an upper and a lower housing member. Where the arrangement differs the correspondence of parts will be obvious to those skilled in the art.

In the embodiments described herein both the upper and lower housing parts are floating, and are mechanically interconnected so as to be pressed together by cylinder pressures. The mechanical connection is such that the force applied to pressing the upper housing part into contact with the valve is less than the cylinder pressures.

In order that the invention may be more clearly understood, one embodiment thereof, by way of example only, will now be described with reference to the accompanying drawings, wherein—

Fig. 5 is a vertical section through the embodiment of the invention shown in Fig. 4.

In the drawings like reference numerals denote like or similar parts.

Figure 1:
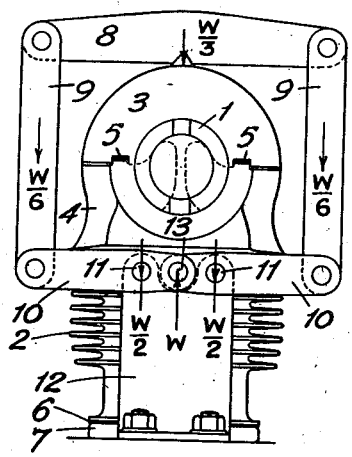
Figure 1 is a diagrammatic view showing the principle of the controllable valve loading method according to the invention.

Referring to the drawings and first more particularly to Figure 1 the housing of the rotary valve 1 is split longitudinally at right angles to the cylinder 2 to provide an upper part 3 and a lower part 4 which is cast integral with the cylinder. The cylinder is made to float by the absence of rigid connection between same and other parts, resilient sealing packings 5 being interposed between the two housing parts 3, 4 and similar packings 6 or other suitable resilient means being interposed between the foot of the cylinder and the engine crankcase or base 7. The cylinder is shaped internally to provide an adequate surface so disposed that cylinder pressures will press the cylinder and lower housing part against the valve.

The housing parts are mechanically connected by linkage fulcrumed about a stationary reaction means, e. g., the crank case, so that both parts are pressed towards each other when there is a rise in pressure in the cylinder, and are positively held engaged with the valve regardless of what the cylinder pressure may be.

In the simple diagrammatic form of linkage shown in Figure 1, the upper valve housing part 3 is connected to the lower housing part 4, by a cross beam 8 connected by a pair of links 9 to the ends of a pair of levers 10, fulcrumed intermediate their ends, at force reaction points 11, on a plate 12 secured to the crank case 7. The inner ends of levers 10 are pivoted on a pin 13 projecting from the cylinder. With this arrangement, the proportion of the cylinder pressure transferred to the upper housing part will depend on the position of the fulcrum points 11 of the levers 10. By so arranging the fulcrums that a gear up will take place to the upper housing part, the bulk of the cylinder pressure will be taken on the plate 12, the remainder being spent in causing the two housing parts to be pressed towards each other. By suitable positioning of the fulcrums 11, any desired degree of loading of upper housing part in relation to cylinder pressure can be obtained.

In the example shown, the leverage employed is of about the order of 3 to 1, and it will be seen that as the cylinder presses upwards with a rise in gas pressure, the outer ends of the levers 10 are pressed downwards and will cause the upper housing part or valve cap 3 to be pressed on to the valve. Therefore, if the cylinder pressure is considered to be a force W lbs., the load on each fulcrum 11 will be W/2 lbs., and the downward pull in each link 9 will be W/6 lbs., and the total downward load on the upper housing part will be W/3 lbs.

Various ways of carrying out the invention can be employed, and the invention is, therefore, not to be considered limited to the constructions herein shown.

Figure 2:
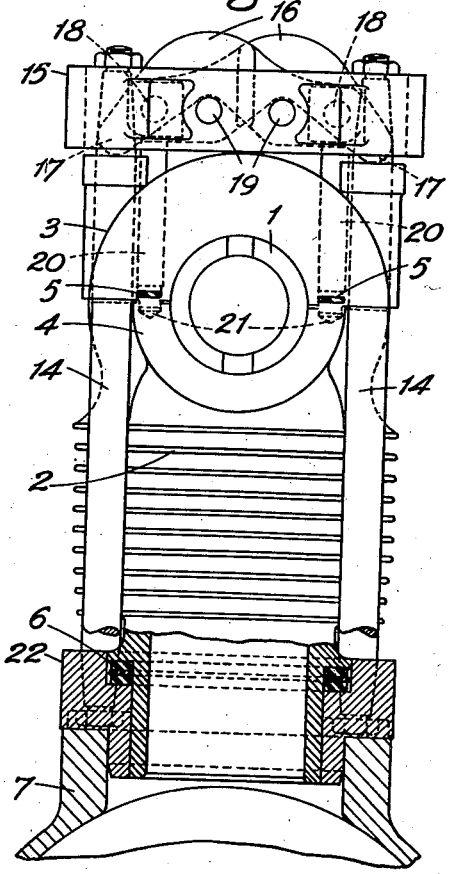
Figure 2 is an elevation, partly in section, of a practical embodiment of the invention.
Figure 3:
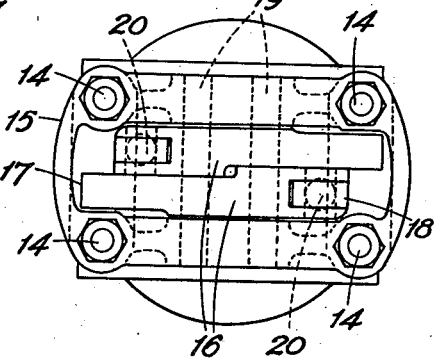
Figure 3 is a plan of Figure 2.

In the embodiment of the invention, as illustrated in Figures 2 and 3, the force reaction members are in the form of tie bolts 14 which are bridged at the top by a plate 15 which carries a pair of oppositely disposed levers 16 pivotally mounted between their ends 17, 18 on parallel pins 19 secured in the bridge plate 15. One end 17 of each lever bears on the side of the upper bearing part 3 which is loosely mounted on the tie bolts 14, and the load is applied to the upper housing part through push rods 20 mounted in recesses 21 in the lower housing part and pressing at their top ends against the opposite ends 18 of the levers 16.

Conveniently, the tie bolts and cylinder together with the sealing packing 6 at the cylinder foot are mounted in an adapter plate 22 secured to the top of the crank case 7.

In this embodiment it will be seen the levers act directly on the upper housing part and apply a push, the force of which is proportional to the cylinder pressures and dependent on the position of the fulcrum pins 19. As shown, the cylinder pressures will be applied to the upper housing part 3 through a leverage of about 3 to 1, so that the downward load on the said part 3 will be about a third of the cylinder pressure.

Figure 4:
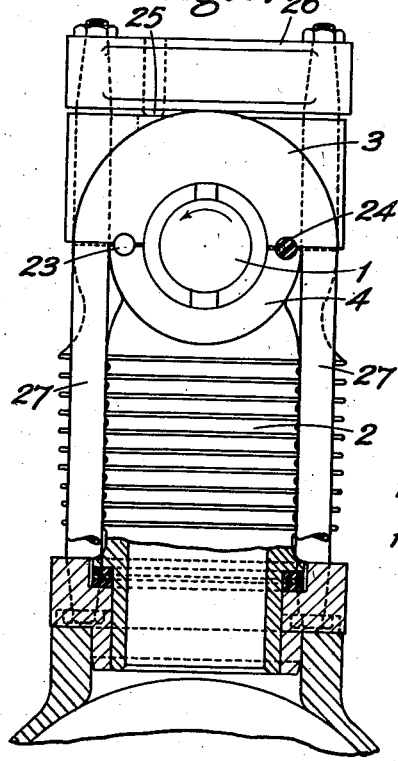
Figure 4 is an elevation of another embodiment of the invention.

In Figures 4 and 5 the floating upper housing part 3 is itself a two-armed lever fulcrumed about a stationary point 25. One arm of the lever carries the actual bearing for the valve, and the pressure applied by the lower housing member 4 is transmitted to the other arm by a joint 23. The position of the fulcrum 25 between the joint 23 and the vertical centre line determines the effective lengths of the lever arms, and thus the amount of pressure applied to the valve. Along the side of the valve remote from the joint 23 is a resilient sealing packing 24. The stationary fulcrum 25 forms part of a bridge 26 carried by stationary force reaction means in the form of tie bolts 27 secured by means of an adapter plate 22 to the top of the crank case 7.

It is understood, of course, that according to each of the embodiments of the invention there is as shown in Fig. 5 a piston 28 reciprocable within the cylinder 2 and connected by a rod 29 with a crank 30 of a crank shaft 31 journaled in the crank case or base 7. Therefore, pressure developed within the cylinder between its outer end and the piston 28 reacts from the crank case (indirectly through the piston, the connecting rod and the crank shaft) to urge the cylinder outwardly relative to the crank case and to cause the inner valve housing part 4, which is fixed relative to the cylinder, to be pressed against the valve, since the valve is held against outward movement because of the connection of its outer housing part 3 with the crank case.

I claim—

1. In combination, a cylinder, a cylindrical valve surmounting said cylinder, a housing for said valve divided into inner and outer floating parts, the inner floating part being movable toward the valve under the action of pressure developed in the cylinder, and a lever system through which said movement of the inner floating part causes the outer floating part to press on the valve with a force which is a controlled fraction of the force applied to the inner floating part by the gas pressure.

2. In combination, a cylinder, a cylindrical valve, a valve housing divided into two floating parts, means to apply pressure developed in the cylinder to one housing part, said latter mentioned housing part being mounted for movement toward the valve under the influence of cylinder pressure, and a mechanical connection between said housing parts effective to cause the said latter mentioned part to transfer a controlled fraction of the force to which it is subjected due to said pressure, to the other housing part in a direction toward the valve, said connection including immovable reaction means which positively hold the housing parts on to the valve whatever the pressure in the cylinder.

3. In combination, a cylinder, a cylindrical valve surmounting said cylinder at right angles thereto, a valve housing divided into inner and outer floating parts, means to apply pressure developed in the cylinder to the inner housing part to move said inner housing part toward the valve, a mechanical connection between the housing parts effective to cause the inner housing part to transfer a controlled fraction of the force to which it is subjected due to said pressure, to the outer housing part to move the latter housing part toward the valve, said connection including immovable reaction means which positively hold the housing parts on to the valve whatever the pressure in the cylinder.

4. In combination, a cylinder, a cylindrical valve surmounting said cylinder, a valve housing divided into inner and outer parts of which the inner part is rigid with the cylinder, a crank case, resilient means between the crank case and the cylinder supporting the cylinder and resiliently maintaining the inner housing part in contact with the valve, resilient means between the two housing parts tending to urge them apart, interior pressure faces at the outer end of the cylinder whereby the inner housing part is pressed on to the valve by pressure developed in the cylinder, and a lever system interconnecting the two housing parts and including reaction fulcrum means carried by the crank case to hold down the parts on to the valve, whatever the gas pressure in the cylinder, said lever system being effective to transfer a controlled fraction of the force due to said pressure from the inner housing part to the outer housing part.

5. In combination, a cylinder, a cylindrical valve surmounting said cylinder, a valve housing divided into inner and outer parts of which the inner part is rigid with the cylinder, a crank case, resilient means between said crank case and the cylinder supporting the cylinder and resiliently maintaining the lower housing part in contact with the valve, interior pressure faces at the outer end of the cylinder whereby the inner housing part is pressed on to the valve by pressure developed in the cylinder, a resilient sealing packing between the two housing parts at one side of the same, a hinge connection between the two housing parts at the other side of the same, and reaction means carried by the crank case and including a fulcrum engaging the outer side of the outer housing part at a point between said hinge connection and the axis of the valve.

6. In combination, a cylinder, a cylindrical valve, a housing for the valve divided into two floating parts of which one part is a two armed lever fulcrummed about a fixed point and having one arm hinged to the other housing part, and means for applying pressure developed in the cylinder to said second mentioned housing part to cause said housing parts to press on the valve.

7. In combination, a cylinder, a cylindrical distributing valve, a valve housing divided into two parts, means by which pressure developed in the cylinder apply a direct thrust on to one of said housing parts to urge said part into engagement with the valve, immovable reaction means positively resisting said thrust and including a mechanical force reducing arrangement on acting the other of said parts in opposition to said thrust whereby the other housing part is pressed on to the valve with a force less than the thrust on the first mentioned housing part.

8. In combination, a cylinder, a cylindrical distributing valve, a valve housing divided into two floating parts, means for applying pressure developed in the cylinder directly to one of the housing parts, and means including a mechanical connection between said housing parts to cause the other housing part to be pressed on to the valve with force which is less than the force applied to the first mentioned part by the cylinder pressure.

9. In combination, a cylinder, a crank case with respect to which said cylinder is longitudinally movable, a crank shaft journaled in said crank case, a piston reciprocable within said cylinder and connected with said crank shaft, an inner housing part for a rotary valve fixed with respect to said cylinder, a cooperating outer housing part movable inwardly and outwardly relative to said inner housing part, a rotary valve between said housing parts, and a connection between the crank case and said outer housing part whereby the housing parts are urged against the valve by pressure developed within the cylinder between its outer end and the piston.

10. The combination as set forth in claim 9 in which the connection between the crank case and the outer housing part includes lever means to cause the outer housing part to be urged against the valve under a force less than the force which is applied to the inner housing part.

11. The combination as set forth in claim 9 in which the connection between the crank case and the outer housing part comprises a bridge member disposed outwardly of the outer housing part, tie rods connecting said bridge member with the crank case, levers pivoted intermediate their ends to said bridge member and each having one end arranged to press inwardly upon the outer housing part when the other end is urged outwardly, and means whereby outward movement of the cylinder relative to the crank case urges the said other ends of said levers outwardly.

ROLAND CLAUDE CROSS.